United States Patent
Kogure (10) Patent No.: US 11,898,964 B2
(45) Date of Patent: Feb. 13, 2024

(54) CAN LID INSPECTION DEVICE, CAMERA POSITION ADJUSTMENT METHOD, AND CAMERA POSITIONING JIG

(71) Applicant: SHOWA ALUMINUM CAN CORPORATION, Tokyo (JP)

(72) Inventor: Toshio Kogure, Tokyo (JP)

(73) Assignee: SHOWA ALUMINUM CAN CORPORATION, Tokyo (JP)

(*) Notice: Subject to any disclaimer, the term of this patent is extended or adjusted under 35 U.S.C. 154(b) by 285 days.

(21) Appl. No.: 17/274,603

(22) PCT Filed: Sep. 6, 2019

(86) PCT No.: PCT/JP2019/035159
§ 371 (c)(1),
(2) Date: Mar. 9, 2021

(87) PCT Pub. No.: WO2020/079987
PCT Pub. Date: Apr. 23, 2020

(65) Prior Publication Data
US 2021/0285890 A1  Sep. 16, 2021

(30) Foreign Application Priority Data
Oct. 15, 2018 (JP) ................. 2018-194151

(51) Int. Cl.
*G01N 21/88* (2006.01)
*H04N 23/695* (2023.01)

(52) U.S. Cl.
CPC .......... *G01N 21/88* (2013.01); *H04N 23/695* (2023.01)

(58) Field of Classification Search
CPC .............................. G01N 21/88; H04N 23/695
See application file for complete search history.

(56) References Cited

U.S. PATENT DOCUMENTS 2,081,131 A * 5/1937 Barnes ................. B67D 1/0829
  222/545
4,215,870 A * 8/1980 Escue .................. F16J 15/3488
  277/379
4,557,599 A * 12/1985 Zimring ................... G01B 3/02
  356/243.1

(Continued)

FOREIGN PATENT DOCUMENTS

CN   107228825 A   10/2017
CN   207232036 U   4/2018

(Continued)

OTHER PUBLICATIONS

International Search Report dated Oct. 15, 2019 issued in corresponding PCT/JP2019/035159 application (2 pages).

(Continued)

*Primary Examiner* — Tri T Ton
*Assistant Examiner* — Jarreas Underwood
(74) *Attorney, Agent, or Firm* — Millen, White, Zelano & Branigan P.C.; William F. Nixon (57) ABSTRACT

A can lid inspection device includes an illuminator to illuminate a can lid. A camera includes a lens holding cylinder. A pedestal base includes a circular inspection hole formed at a center. The pedestal base mounts the camera to position the lens holding cylinder. A support pole includes a lower end to fix the illuminator and an upper portion supporting the pedestal base. A camera positioning jig includes a ring-shaped body. A flange portion protrudes from an outer peripheral surface of the ring-shaped body. An outer diameter portion of the ring-shaped body fits in the inspection hole. The inner diameter portion of the ring-shaped body fits the lens holding cylinder. An illumination center calibration jig detachably mounts on a lower surface of the illuminator and has a mark indicating a center of the illuminator. An analysis device analyzes an image of the can lid captured by the camera.

3 Claims, 12 Drawing Sheets

(56) References Cited

U.S. PATENT DOCUMENTS

| | | | | |
|---|---|---|---|---|
| 5,055,695 | A * | 10/1991 | Lange | G01B 11/27 250/461.1 |
| 5,592,286 | A * | 1/1997 | Fedor | G01N 21/909 356/240.1 |
| 6,151,407 | A * | 11/2000 | Conlon | G01N 21/8806 382/153 |
| 6,320,641 | B1 * | 11/2001 | Bauer | H04N 23/56 348/E5.029 |
| 11,047,758 | B1 * | 6/2021 | Fitch | B65D 88/06 |
| 2007/0002468 | A1 * | 1/2007 | Iikawa | G02B 7/023 359/811 |
| 2008/0291440 | A1 * | 11/2008 | Sones | G01N 21/909 356/240.1 |
| 2010/0188841 | A1 * | 7/2010 | Rahbar-Dehghan | H04N 17/002 362/109 |
| 2011/0054327 | A1 * | 3/2011 | Kim | A61B 5/0077 600/473 |
| 2012/0188558 | A1 * | 7/2012 | Yamagata | G01B 3/30 356/601 |
| 2016/0147055 | A1 * | 5/2016 | Moriuchi | G02B 21/084 359/387 |
| 2017/0280036 | A1 * | 9/2017 | Morinaga | H04N 23/54 |
| 2018/0017758 | A1 * | 1/2018 | Takehana | G03B 21/147 |
| 2019/0168686 | A1 * | 6/2019 | Haidong | B60R 11/04 |
| 2020/0049495 | A1 * | 2/2020 | Zhao | G01B 11/24 |

FOREIGN PATENT DOCUMENTS

| | | |
|---|---|---|
| JP | 63-151803 A | 6/1988 |
| JP | 3-45785 B2 | 7/1991 |
| JP | 3-260876 A | 11/1991 |
| JP | 7-270864 A | 10/1995 |
| JP | 8-101137 A | 4/1996 |
| JP | 9021939 A2 | 1/1997 |
| JP | 10-239249 A | 9/1998 |
| JP | 2008003418 A | 1/2008 |
| JP | 2008-70202 A | 3/2008 |
| JP | 2008070202 A | 3/2008 |
| JP | 2012-242233 A | 12/2012 |
| JP | 2015-30050 A | 2/2015 |

OTHER PUBLICATIONS

Office Action in corresponding Japanese Patent Application No. 2018-19415 dated Aug. 5, 2022 (pp. 1-2) and english translation thereof (pp. 1-2).

Search report in corresponding EP application 19872602.8 dated Jun. 15, 2022 (pp. 1-6).

Notice of Reasons for Refusal in corresponding JP appln. 2018-194151 dated Jun. 7, 2022 (pp. 1-3) and english translation thereof (pp. 1-3).

Office Action in corresponding EP Patent Application No. 19 872 602.8 dated May 11, 2023 (pp. 1-5).

"Prud'homme Transmissions—F 93203 Saint-Denis Cedex—Tel Bagues de Glissement en Bronze", Jul. 2, 2012 (Jul. 2, 2012), XP093030814, pp. 1-7, Retrieved from the Internet: URL:https://www.sepem-permanent.com/fichiers_produits/14921361977193bagues_de_glissementpdf.

* cited by examiner

CAN LID INSPECTION DEVICE, CAMERA POSITION ADJUSTMENT METHOD, AND CAMERA POSITIONING JIG

TECHNICAL FIELD

The present invention relates to a can lid inspection device for inspecting a can lid for attaching to a can holding cylinder for beverages and food, and their related techniques.

BACKGROUND OF THE INVENTION

The above-described can lid is produced through a shell press for punching an aluminum thin plate or a steel thin plate into a circular shape with a curled portion at the outer peripheral portion, and a coating step for applying a compound to the curled part to enhance the airtightness to a can body, and a conversion press for processing a drinking port and attaching a tab to the drinking port. These processes are sequentially performed while conveying a workpiece with a conveyor, and inspections during the process and after the completion of the can lid are also performed in the series of processes. As the can lid inspections, an inner surface inspection (EIT) is performed after the coating step, and a rivet test (RIT), an outer surface inspection (EOS), and an inner surface inspection (EIS) are performed after the conversion press. In these inspections, captured images are analyzed to determine the quality of the can lid (see Patent Documents 1 to 3).

Patent Document 1 describes an inspection device for detecting defects by capturing an image of an outer peripheral surface of stacked can lids. Patent Document 2 and Patent Document 3 describe a device for inspecting the application failure of a compound on an outer peripheral portion of a can lid.

PRIOR ART DOCUMENT

Patent Document

Patent Document 1: Japanese Unexamined Patent Application Publication No. H10-239249
Patent Document 2: Japanese Examined Patent Application Publication No. H3-45785
Patent Document 3: Japanese Unexamined Patent Application Publication No. S63-151803

SUMMARY OF THE INVENTION

Problems to be Solved by the Invention

Although Patent Documents 1 to 3 disclose inspection methods, they are silent about inspection accuracy and a method for improving inspection accuracy.

Means for Solving the Problem

The present invention has been made in view of the above-described technical background, and an object of the present invention is to provide a can lid inspection device and a camera position adjustment method with high inspection accuracy and a camera positioning jig for use in the same.

That is, the present invention has the configuration as recited in the following Items [1] to [4].

[1] A can lid inspection device comprising:
a ring-shaped illuminator configured to illuminate a can lid placed on an inspection table;
a camera having a cylindrical lens holding cylinder;
a pedestal base having a circular inspection hole formed at a center, the pedestal base being configured to mount the camera at a position where the lens holding cylinder faces the inspection hole;
a support pole including a lower end to which the illuminator is fixed and an upper portion supporting the pedestal base;
a camera positioning jig including a ring-shaped body and a flange portion protruded from an outer peripheral surface of the ring-shaped body, the ring-shaped body including an outer diameter portion having an outer diameter corresponding to a diameter of the inspection hole of the pedestal base and an inner diameter portion having an inner diameter corresponding to an outer diameter of the lens holding cylinder of the camera, the outer diameter portion of the ring-shaped body being configured to fit in the inspection hole, and the inner diameter portion of the ring-shaped body being configured to fit the lens holding cylinder;
an illumination center calibration jig configured to be detachably mounted on a lower surface of the illuminator, the illumination center calibration jig having a mark indicating a center of the illuminator; and
an analysis device configured to analyze an image of the can lid captured by the camera.

[2] The can lid inspection device as recited in the above-described Item [1],
wherein the ring-shaped body of the camera positioning jig is configured by a partial ring-shaped body of a perfect ring-shaped body, the partial ring-shaped body having a center angle of 90° to 180°.

[3] A method of adjusting a camera position in the can lid inspection device as recited in the above-described Item [1] or [2], the method comprising:
aligning a centerline of the inspection hole and a centerline of the lens holding cylinder by fitting the lens holding cylinder to the camera positioning jig fitted in the inspection hole of the pedestal base;
imaging the illumination center calibration jig attached to the lower end of the illuminator; and
adjusting an inclination of the pedestal base so that the center of the illuminator coincides with a center of an image which is the center of the lens holding cylinder in a captured image.

[4] A camera positioning jig for aligning a centerline of a circular inspection hole formed in a pedestal base with a centerline of a lens holding cylinder of a camera, the cameral positioning jig comprising:
a ring-shaped body; and
a flange portion protruded from an outer peripheral surface of the ring-shaped body,
wherein the ring-shaped body includes an outer diameter portion having an outer diameter corresponding to a diameter of the inspection hole of the pedestal base and an inner diameter portion having an inner diameter corresponding to an outer diameter of the lens holding cylinder of the camera, the outer diameter portion of the ring-shaped body being configured to fit in the inspection hole, and the inner diameter portion of the ring-shaped body being configured to fit the lens holding cylinder.

Effects of the Invention

According to the can lid inspection device as recited in the above-described Item [1], by aligning the centerline of the holding cylinder of the lens holding cylinder with the centerline of the inspection hole by fitting the lens holding cylinder of the camera to the camera positioning jig fitted in the inspection hole formed in the center of the pedestal base and by aligning the centerline of the lens holding cylinder with the center of the illuminator indicated on the illumination center calibration jig, the center of the image captured by the camera can be aligned with the center of the illuminator. Therefore, by capturing the image when the center of the can lid coincides with the center of the image, an image in which the can lid is illuminated evenly from all directions in the circumferential direction is obtained. In the image analysis based on such an image, it is possible to eliminate the deterioration of the inspection accuracy due to light unevenness and improve the inspection accuracy.

According to the can lid inspection device as recited in the above-described Item [2], since the camera positioning jig is configured by a partial ring-shaped body having a center angle of 90° to 180°, the attachment and detachment with respect to the inspection hole of the pedestal base can be performed easily.

According to the method of adjusting a camera position as recited in the above-described Item [3], by aligning the centerline of the holding cylinder of the lens holding cylinder with the centerline of the inspection hole by fitting the lens holding cylinder of the camera to the camera positioning jig fitted in the inspection hole formed in the center of the pedestal base and by aligning the centerline of the lens holding cylinder with the center of the illuminator indicated on the illumination center calibration jig, the center of the image captured by the camera can be aligned with the center of the illuminator.

According to the camera positioning jig as recited in the above-described Item [4], the centerline of the holding cylinder of the lens holding cylinder can be aligned with the centerline of the inspection hole by fitting the lens holding cylinder of the camera to the camera positioning jig fitted in the inspection hole formed in the center of the pedestal base.

EMBODIMENTS FOR CARRYING OUT THE INVENTION

An embodiment of a can lid inspection device according to the present invention is shown in FIG. 1 to FIG. 9B.

The can lid inspection device 1 is disposed above the conveyor 2 for conveying a can lid W so that it is away from the mounting surface of the conveyor 2 and the lower surface thereof is in parallel with the mounting surface. Then, the can lid W conveyed directly under the can lid inspection device 1 is sequentially imaged and inspected by an image analysis. Note that the conveyor 2 corresponds to the inspection table recited in the present invention. When the can lid inspection device 1 is used, a cover covering the entirety of the inspection device is used to eliminate effects of external light. However, FIG. 1, FIG. 6A, FIG. 7A, FIG. 8A, and FIG. 9A illustrate a state in which the cover is removed.

The can lid inspection device 1 is provided with, as main component members, three support poles 10, an illuminator 20, a first pedestal base 30, a second pedestal base 40, a camera 50, a camera positioning jig 100, and an illumination center calibration jig 110, and is further provided with an image analysis device (not shown). Note that, in FIG. 1, FIG. 6B, FIG. 7A, FIG. 8A, and FIG. 9A, only two support poles 10 on the front side of each drawing are illustrated and the one on the rear side is omitted.

Figure 1:
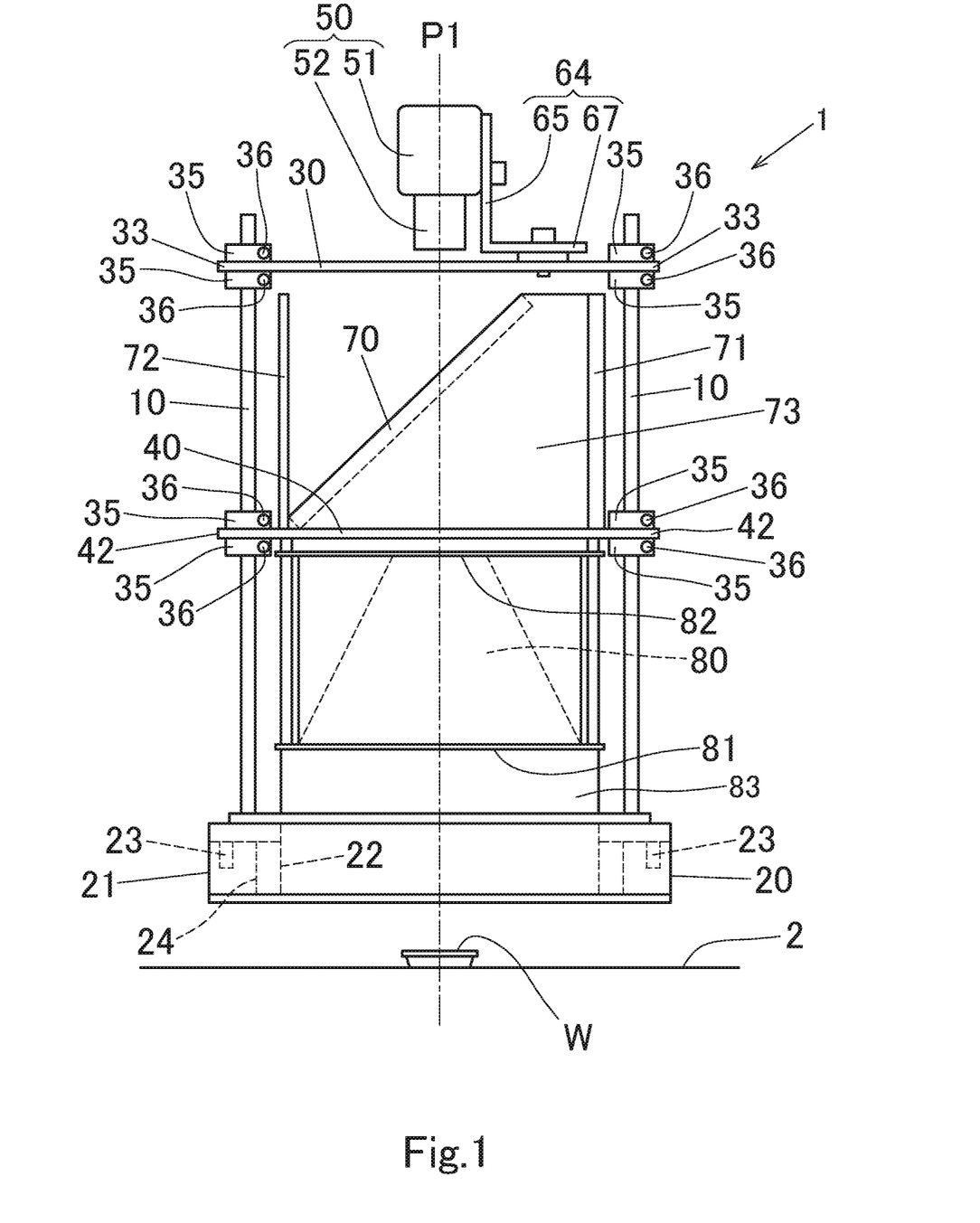
FIG. 1 is a front view of a can lid inspection device according to the present invention.

The illuminator 20 has a ring-shape having a centerline P1 and is fixed to the lower ends of the three support poles 10 in such a manner that all of the support poles 10 are parallel to the centerline P1. In the illuminator 20, the inner peripheral surface of the ring-shaped case 21 is formed by a light-transmissive protective cover 22, and the inner side of the ring-shaped case 21 serves as an illumination area. A plurality of LED light bulbs 23 is attached to the upper surface of the ring-shaped case 21 at predetermined intervals in the circumferential direction, and the illumination area is uniformly illuminated in the circumferential direction by a diffuser 24 mounted on the inner peripheral side of the annular row of the LED light bulbs 23. The illuminator 20 is a main illuminator for illuminating the can lid W which is an inspection target and the conveyor 2 for placing the can lid W thereon.

The first pedestal base 30 is provided at the upper portions of the support poles 10. The second pedestal base 40 is provided at a substantially intermediate position between the first pedestal base 30 and the illuminator 20. The camera 50 is mounted on the first pedestal base 30. An auxiliary illuminator, which will be described later, is mounted on the second pedestal base 40.

Figure 2:
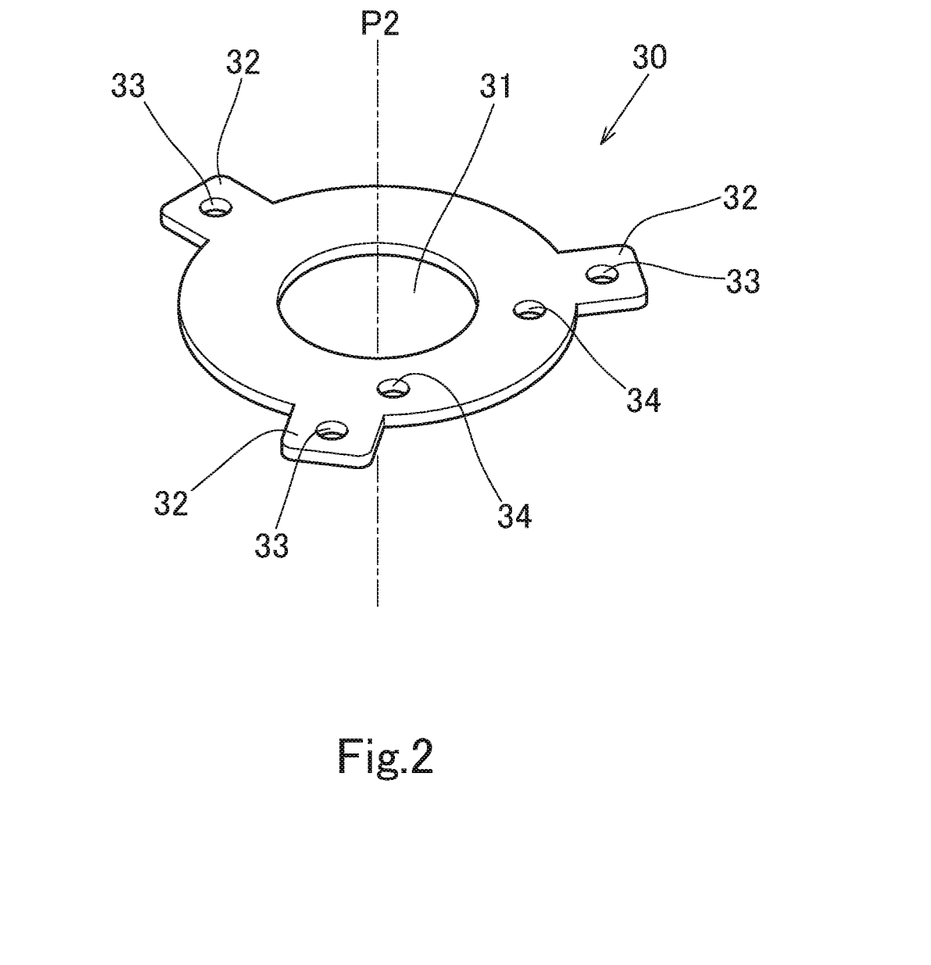
FIG. 2 is a perspective view of a first pedestal base mounted on a can lid inspection device of FIG. 1.

As shown in FIG. 2, the first pedestal base 30 is a circular plate in which a circular inspection hole 31 for imaging is formed at the center. An engaging portion 32 extending radially outward is provided at three locations of the outer peripheral edge and is provided with an engaging hole 33 in the center. The centerline of the inspection hole 31 is denoted by P2. Two base plate attachment holes 34 are provided beside the inspection hole 31. The first pedestal base 30 is attached at a predetermined height of the support poles 10 by penetrating the support poles 10 into the respective engaging holes 33 of the three engaging portions 32 and each tightening a C-shaped collar 35 disposed above and below the engaging portion 32 with a bolt 36. Each of the three collars 35 can be attached at any position on the support pole 10, and the attachment height of the first pedestal base 30 is set by the attachment position of the collar 35.

The camera 50 is composed of a rectangular parallelepiped main body 51 and a cylindrical lens holding cylinder 52 protruding from one surface of the main body 51 and is attached to the first pedestal base 30 via a rectangular base plate 60 and an L-shaped bracket 64. The centerline of the lens holding cylinder 52 is defined as P3 (see FIG. 3B). When an image is captured with the camera 50, the position of the centerline P3 becomes the center of the image.

Figure 3A:
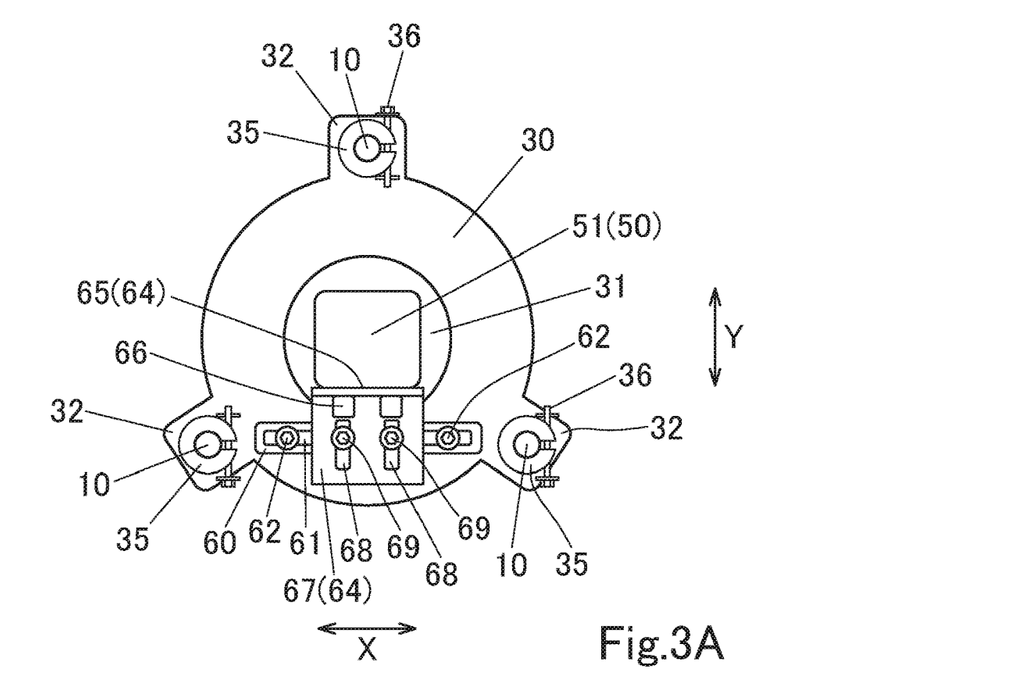
FIG. 3A shows a plan view of a first pedestal base with a camera attached.
Figure 3B:
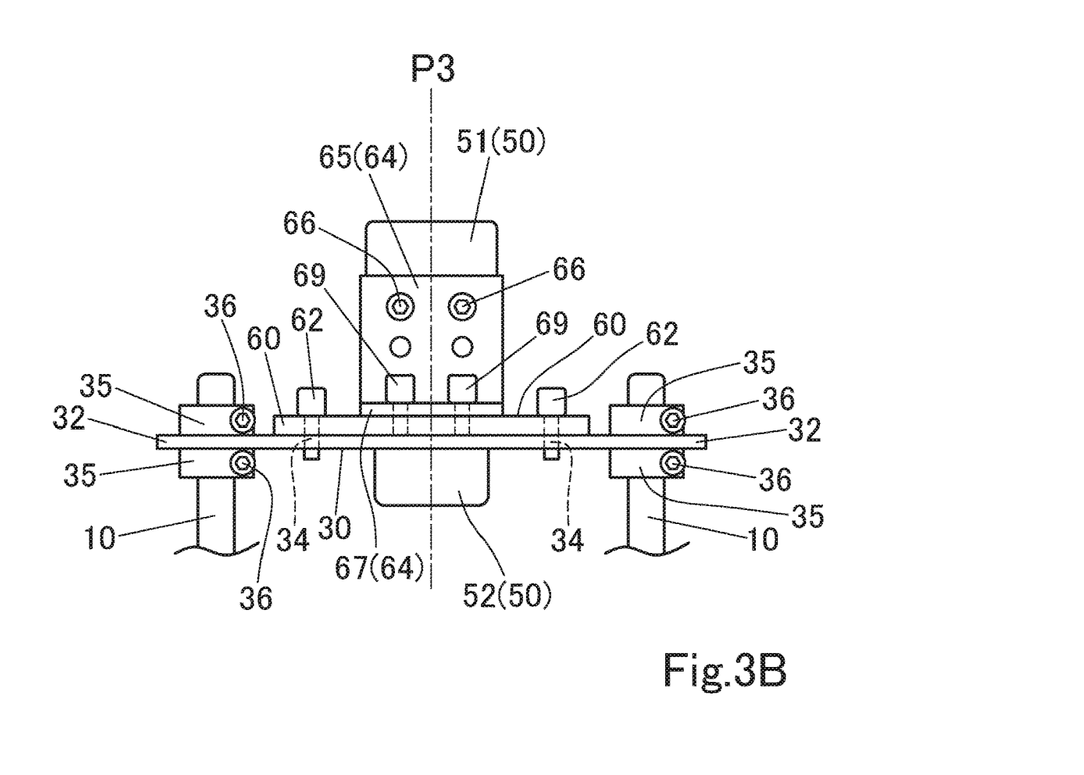
FIG. 3B is a side view of a first pedestal base with a camera attached.

The base plate 60 is fixed to the first pedestal base 30 by aligning a long hole 61 formed along the longitudinal direction with the base plate attachment holes 34 of the first pedestal base 30, inserting bolts 62 into the long hole 61 and the base plate attachment holes 34, and tightening the bolts 62. Note that, by loosening the inserted bolts 62, it is possible to slide the base plate 60 secured to the first pedestal base 30 along the longitudinal direction of the long hole 61. Here, the sliding direction of the base plate 60 on the first pedestal base 30 is defined as an X-direction (see FIG. 3A). In the bracket 64, the main body 51 of the camera 50 is fixed to the vertical portion 65 with bolts 66, and the horizontal portion 67 is secured to the base plate 60. The vertical portion 65 is provided with two pairs of upper and lower bolt holes so that the mounting height of the camera 50 can be selected. FIG. 3B shows an example in which the main body 51 is mounted using the upper bolt holes. The horizontal portion 67 is provided with two long holes 68 in a direction perpendicular to the vertical portion 65. The bracket 64 is fixed to the base plate 60 by tightening the bolts 69 inserted in the long hole 61 of the base plate 60 in a state in which the long hole 68 of the horizontal portion 67 is arranged perpendicular to the long hole 61 of the base plate 60. Also, by loosening the inserted bolts 69, the horizontal portion 67 secured to the base plate 60 can be slid along the longitudinal direction of the long holes 68. Here, the longitudinal direction of the long hole 68 of the horizontal portion 67 secured to the base plate 60 is defined as a Y-direction perpendicular to the X-direction (see FIG. 3A).

As described above, the bracket 64 can be slid in the X-direction together with the base plate 60, and also can be slid in the Y-direction on the base plate 60. Further, the camera 50 can be slid on the first pedestal base 30 in the X- and the Y-direction via the base plate 60 and the bracket 64 and fixed at any position within the slide range.

An image captured by the camera 50 is sent to an image analysis device which is not illustrated.

The second pedestal base 40 has the same shape as the first pedestal base 30. Similarly, from the outer peripheral edge of the circular plate in which an inspection hole is formed in the center, an engaging portion 42 in which a circular engaging hole is formed is extended. In the same manner as in the first pedestal base 30, the second pedestal base 40 is attached to the three support poles 10 by C-shaped collars 35 and bolts 36.

On the upper surface of the second pedestal base 40, a beam splitter 70 is mounted at an inclination angle of 45° with respect to the second pedestal base 40. A light source 71 is disposed on the upper end side of the beam splitter 70, and a shielding plate 72 is disposed on the lower end side facing the light source 71. Further, a cover 73 is disposed on the two sides except for the upper end side and the lower end side of the beam splitter 70. The light emitted from the light source 71 and incident on the beam splitter 70 at 45° is divided into transmitted light and reflected light having a reflection angle of 45°. The transmitted light is absorbed by the shielding plate 72, and the reflected light illuminates the conveyor 2 through the upper end opening portion 82 of a funnel 80. The light source 71 and the beam splitter 70 constitute an auxiliary illuminator for illuminating the can lid W which is an inspection target and the conveyor 2 for placing the can lid W thereon.

Further, between the illuminator 20 and the second pedestal base 40, the funnel 80 which is enlarged in the diameter toward the downward side is mounted. A cylindrical spacer 83 is mounted between the lower end opening 81 of the funnel 80 and the illuminator 20.

Figure 4:
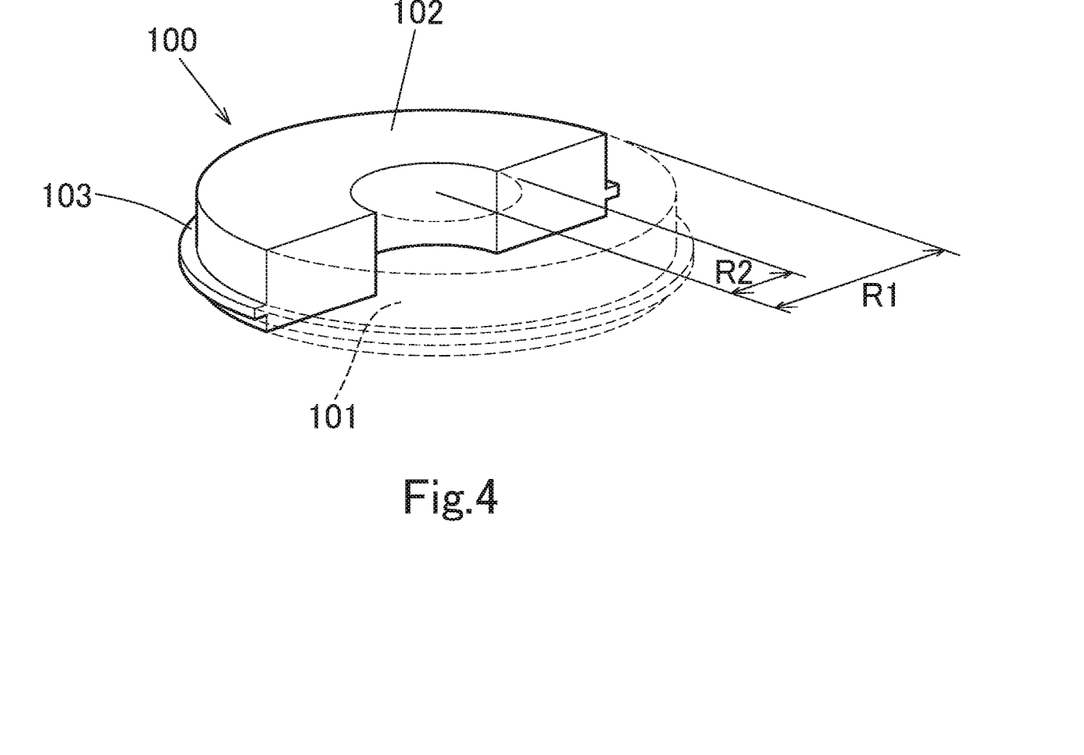
FIG. 4 is a perspective view of a camera positioning jig.
Figure 5:
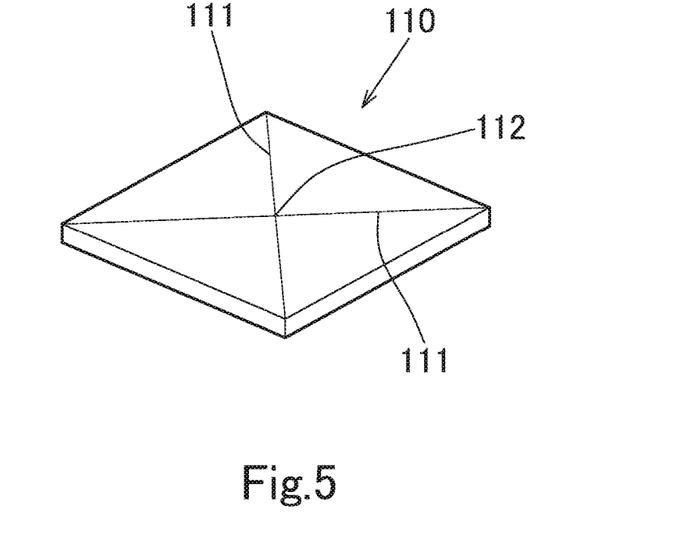
FIG. 5 is a perspective view of an illumination center calibration jig.

The can lid inspection device 1 is provided with, as an adjustment jig used before initiating the inspection, a camera positioning jig 100 shown in FIG. 4 and an illumination center calibration jig 110 shown in FIG. 5.

The camera positioning jig 100 is provided with a half ring-shaped body 102 constituted by a part of a perfect ring-shaped body 101, the part having a center angle of 180°, and a flange portion 103 projecting from the outer peripheral surface of the half ring-shaped body 102. The outer surface and the inner surface of the ring-shaped body 101 are concentric. The outer diameter R1 corresponds to the diameter of the inspection hole 31 of the first pedestal base 30 and is slightly reduced in the diameter so as to fit into the inspection hole 31. The inner diameter R2 corresponds to the outer diameter of the lens holding cylinder 52 of the camera 50 and is slightly enlarged in the diameter so as to fit the lens holding cylinder 52. The flange 103 protrudes in the entire circumferential direction at a position slightly below the midpoint in the height direction of the half ring-shaped body 102. When the half ring-shaped body 102 of the camera positioning jig 100 is fitted in the inspection hole 31 of the first pedestal base 30, the half ring-shaped body 102 is supported on the first pedestal base 30 by the flange portion 103.

The illumination center calibration jig 110 has marks indicating two diagonal lines 111 on a square resin plate. The illumination center calibration jig 110 is attached to the lower end surface of the illuminator 20 such that the position of the centerline P1 of the illuminator 20 coincides with the intersection point 112 of the diagonal lines 111. The intersection point 112 indicates the center of the illuminator 20. The attachment position of the illumination center calibration jig 110 in the illuminator 20 is preset.

[Procedure for Adjusting can Lid Inspection Device]

With reference to FIG. 6A to FIG. 9B, the procedure for adjusting the centerline P3 of the lens holding cylinder 52 of the camera 50 with the centerline P1 of the illuminator 20 will be described.

Figure 6A:
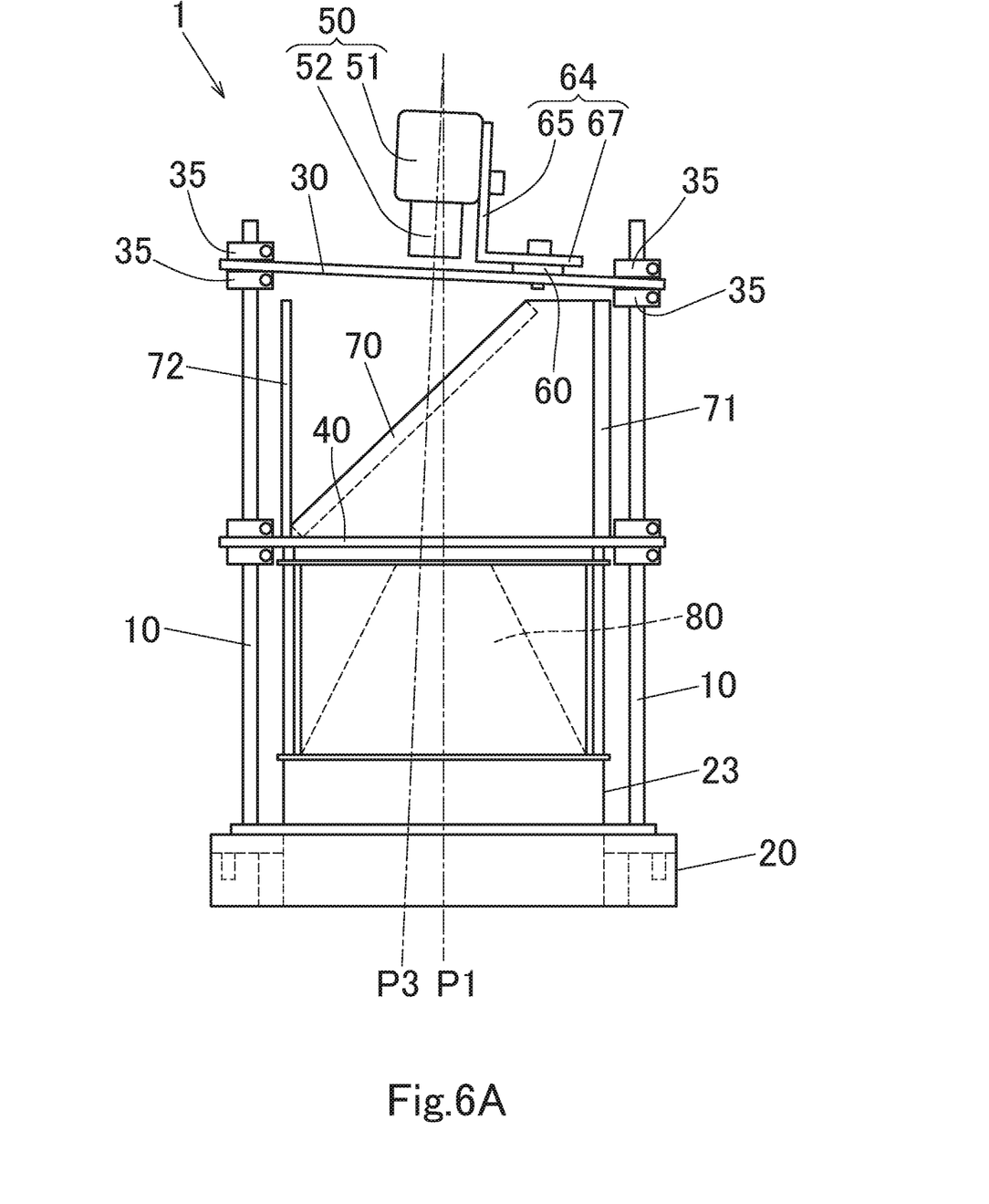
FIG. 6A is a front view of a can lid inspection device before adjusting a camera position.
Figure 6B:
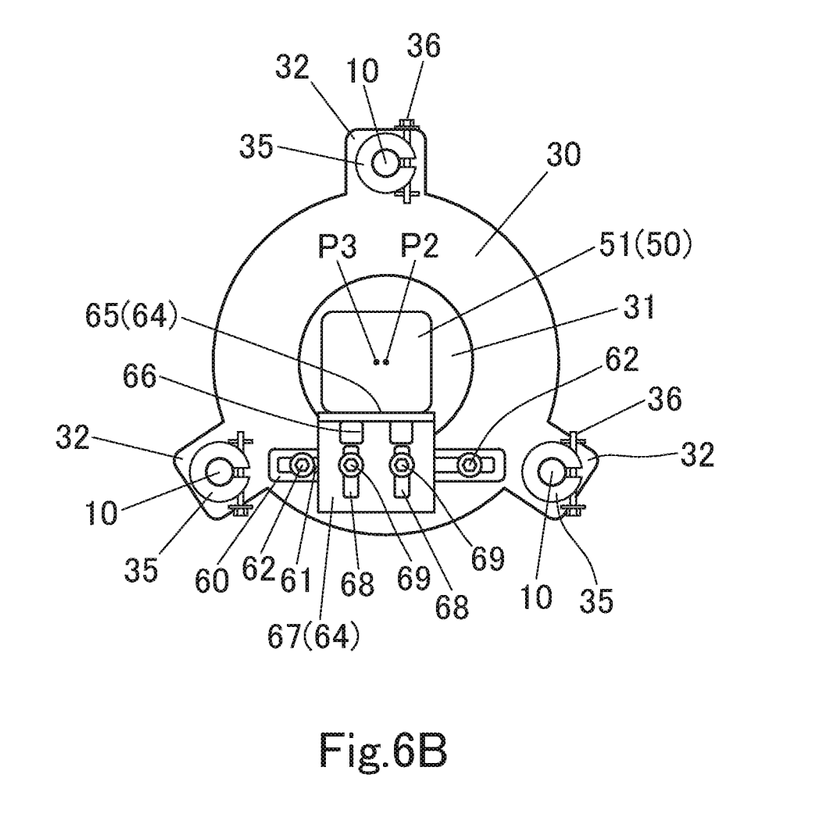
FIG. 6B is a plan view of a first pedestal base of a can lid inspection device before adjusting the camera position.

(1) FIG. 6A and FIG. 6B show a pre-adjustment condition. The camera 50 is temporarily mounted on the first pedestal base 30 via the base plate 60 and the bracket 64. However, the centerline P3 of the lens holding cylinder 52 deviates from the centerline P1 of the illuminator 20 (see FIG. 6A) and also deviates from the centerline P2 of the inspection hole 31 of the first pedestal base 30 (see the FIG. 6B).

(2) The attachment position of the camera 50 in the bracket 64 is adjusted. Using a square or the like, the attachment angle of the camera body 51 at the vertical portion 65 is adjusted so that the centerline P3 of the lens holding cylinder 52 is precisely perpendicular to the horizontal portion 67 of the bracket 64.

Figure 7A:
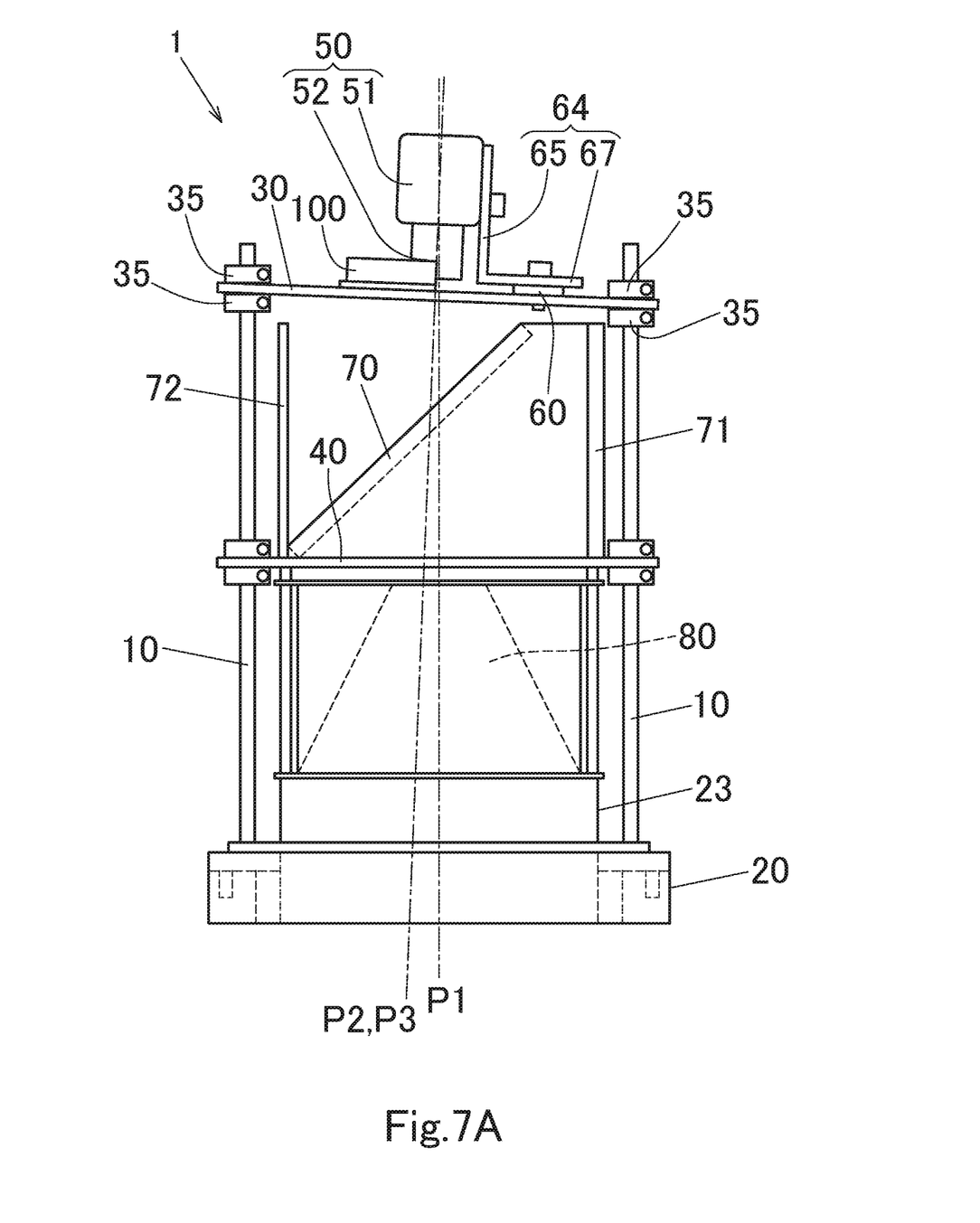
FIG. 7A shows a front view of a can lid inspection device with a camera positioning jig mounted.
Figure 7B:
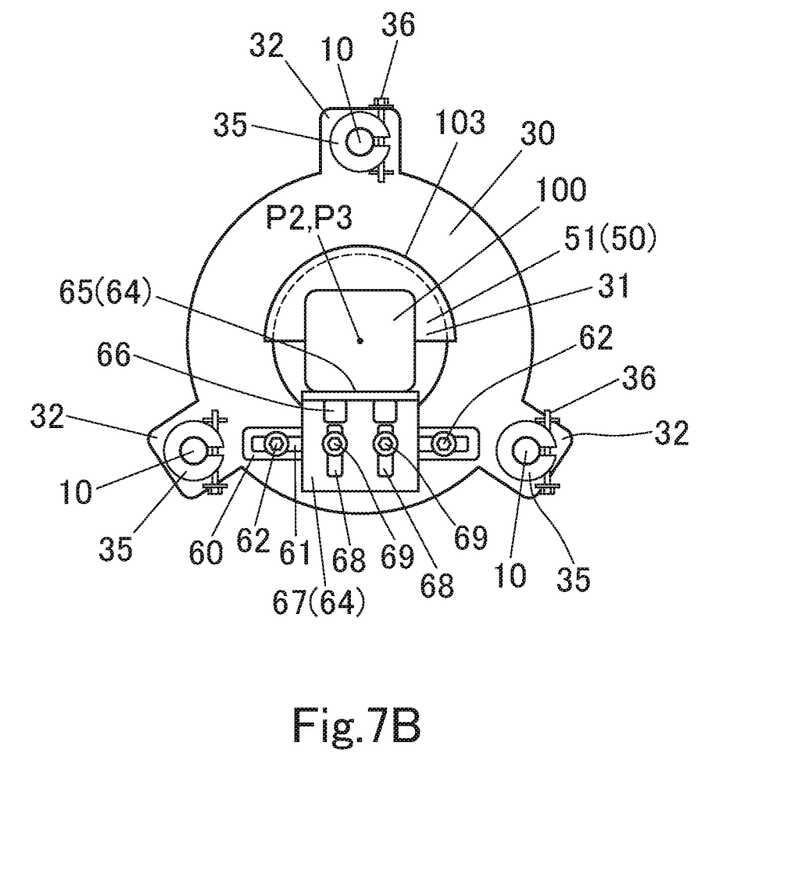
FIG. 7B is a plan view of a first pedestal base of a can lid inspection device with a camera positioning jig mounted.

(3) As shown in FIG. 7A and FIG. 7B, the camera positioning jig 100 is fitted in the inspection hole 31 of the first pedestal base 30, and the lens holding cylinder 52 is fitted to the camera positioning jig 100. To perform this operation, the bolts 62 and 69 are loosened and the bracket 64 is appropriately slid in the X-direction and the Y-direction to form a space for inserting the camera positioning jig 100 between the inspection hole 31 and the lens holding cylinder 52. The camera positioning jig 100 is fitted in the inspection hole 31, and the bolts 62 and 69 are tightened in a position in a state in which the lens holding cylinder 52 is fitted to the camera positioning jig 100 to fix the camera 50 to the first pedestal base 30. The inspection hole 31, and the outer peripheral surface and the inner peripheral surface of the camera positioning jig 100 are concentric. Therefore, when the lens holding cylinder 52 is fitted to the camera positioning jig 100, the centerline P3 of the lens holding cylinder 52 coincides with the centerline P2 of the inspection hole 31.

(4) The illumination center calibration jig 110 is attached to the lower end of the illuminator 20 to display the position of the centerline P1 of the illuminator 20 by the intersection point 112 of the diagonal lines 111 of the illumination center calibration jig 110. When imaging is performed with the illumination center calibration jig 110 attached, the position of the centerline P1 of the illuminator 20 is reflected on the image as the intersection point 112 of the diagonal lines 111. When the center of the captured image, that is, the centerline P3 of the lens holding cylinder 52, coincides with the centerline P1 of the illuminator 20, the intersection point 112 of the diagonal lines 111 coincides with the center P3 of the image (see FIG. 9A and FIG. 9B), and when not coincide, the intersection point 112 of the diagonal lines 111 deviates from the center P3 of the image (see FIG. 8A and FIG. 8B). The presence or absence of the deviation between the center P3 of the image and the intersection point 112 is determined by an image analysis device.

Figure 8A:
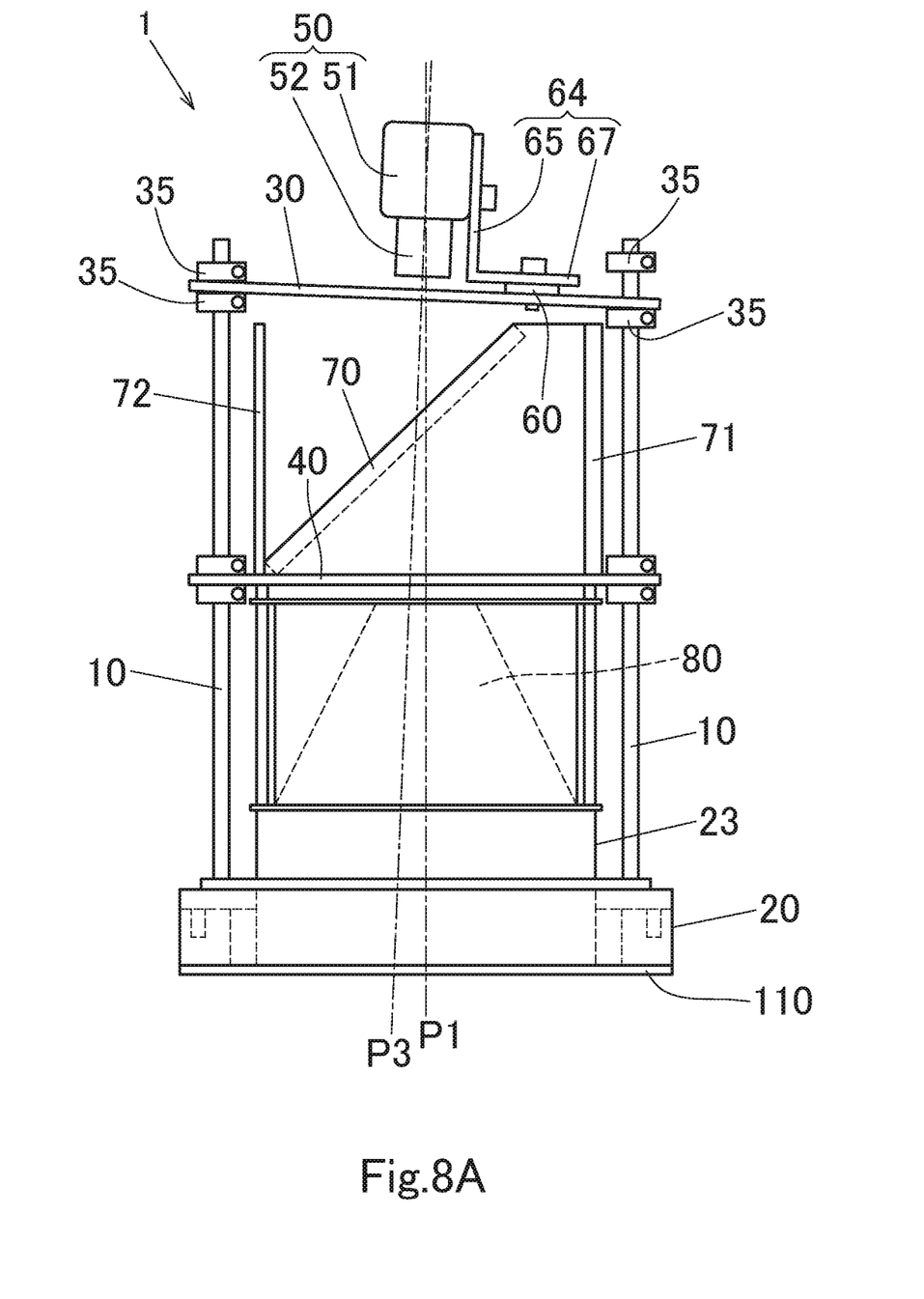
FIG. 8A is a front view of a can lid can lid inspection device with an illumination center calibration jig attached.
Figure 8B:
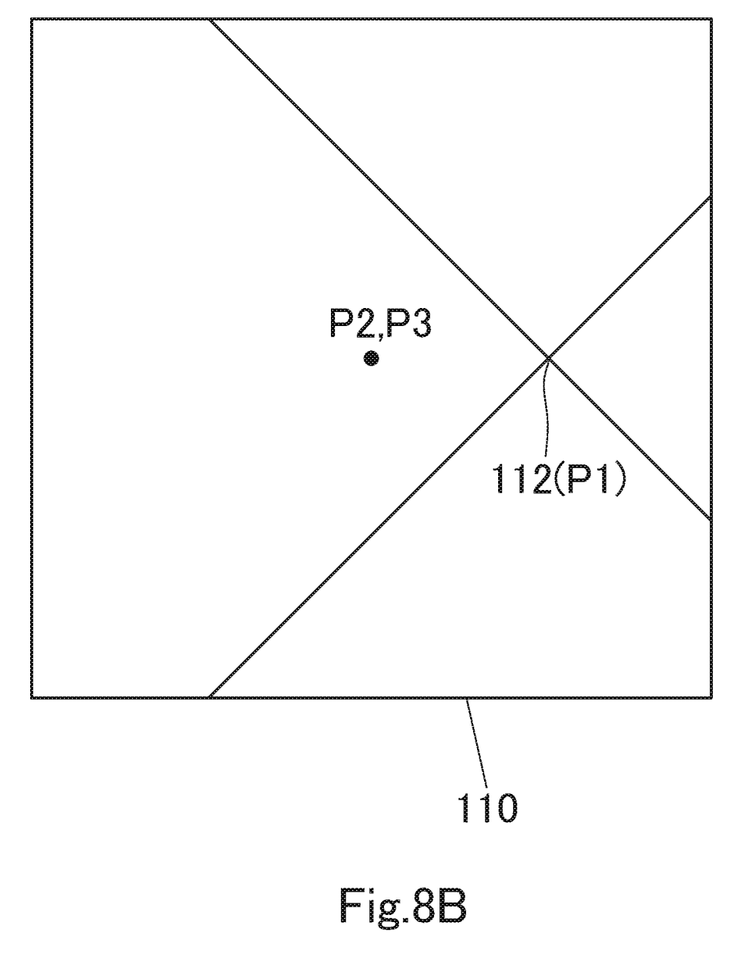
FIG. 8B shows an image in which an illumination center calibration jig is captured in the can lid inspection device in FIG. 8A.
Figure 9A:
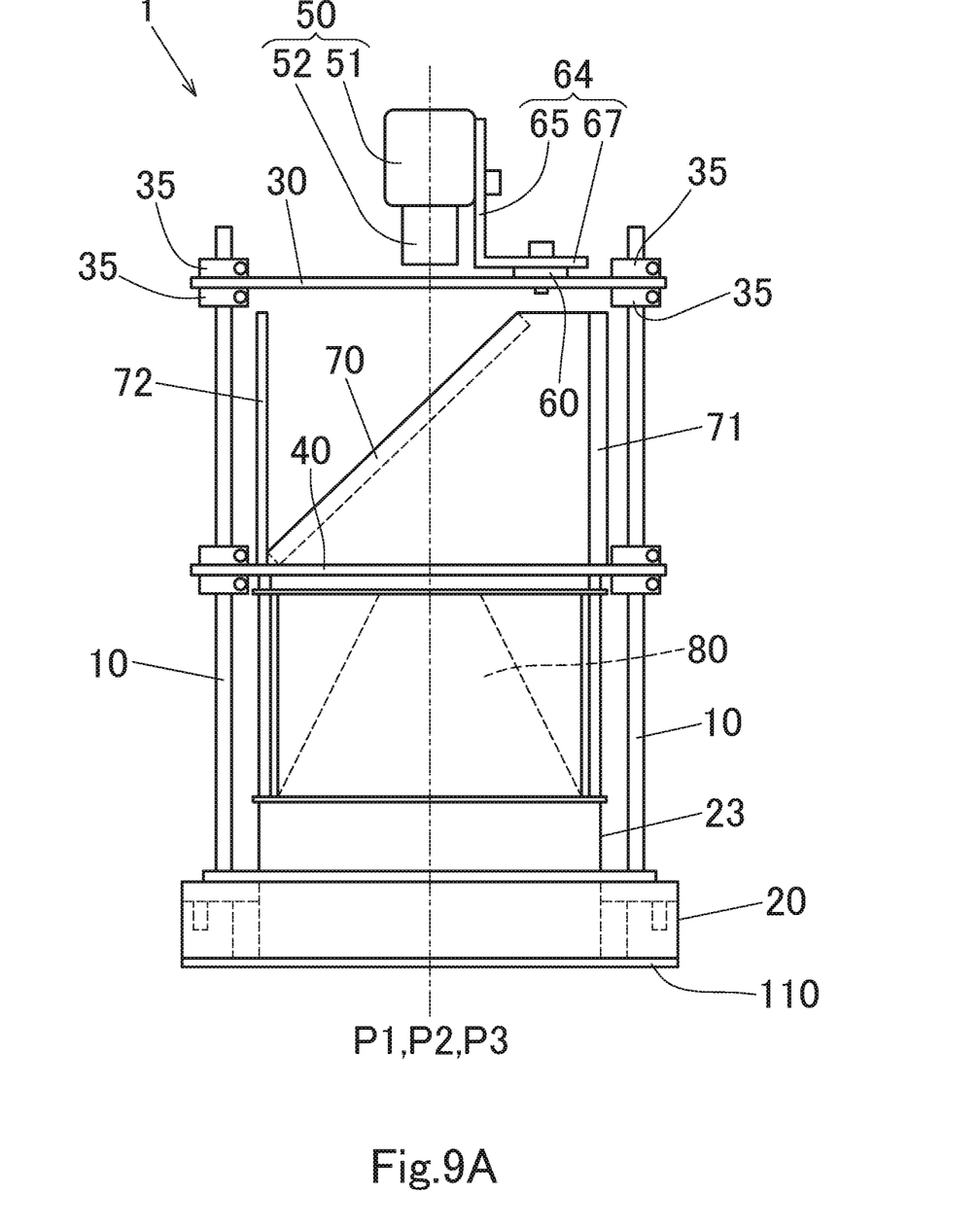
FIG. 9A shows a front view of a can lid inspection device in which a centerline of a lens holding cylinder coincides with a centerline of an illuminator.
Figure 9B:
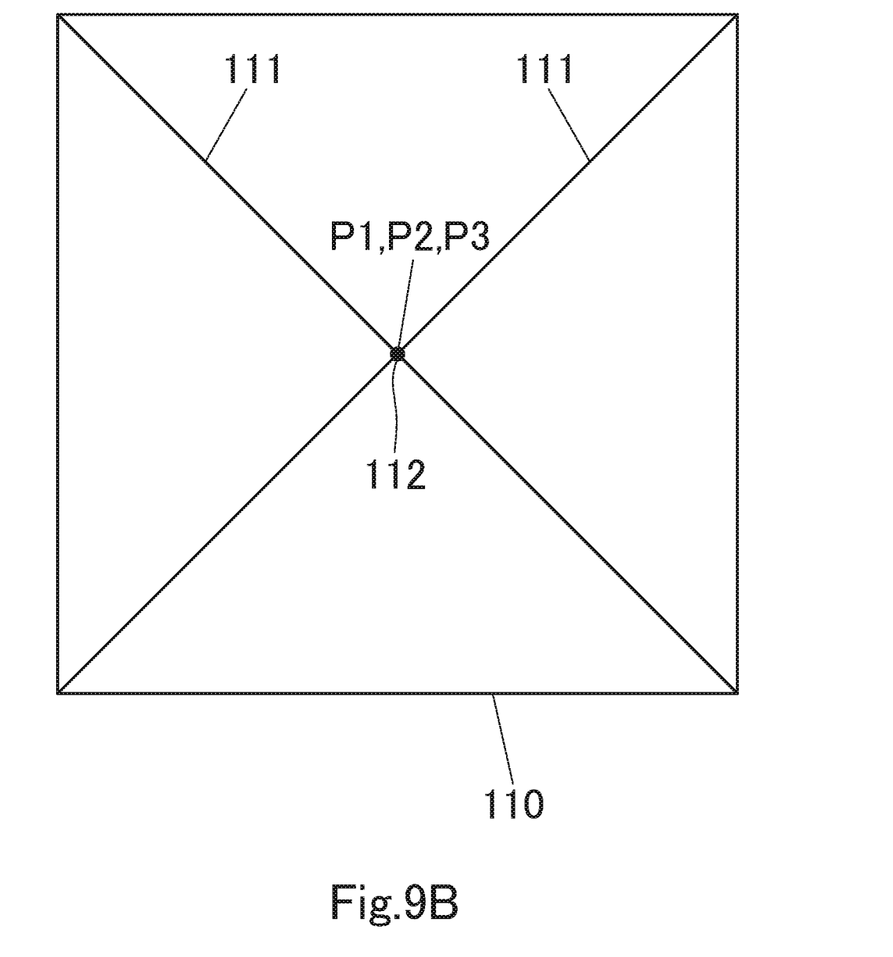
FIG. 9B shows an image in which an illumination center calibration jig is captured in the can lid inspection device in FIG. 9A.

(5) In the image captured in the above-described item (4), when the intersection point 112 (the centerline P1 of the illuminator 20) of the diagonal lines 111 deviates from the image center P3 (see FIG. 8B), the first pedestal base 30 is inclined with respect to the illuminator 20. Therefore, the attachment positions of the three engaging portions 32 of the pedestal base 30 in the vertical direction on the support poles 10 are adjusted to adjust the inclination of the first pedestal base 30 so that the intersection point 112 of the diagonal lines is positioned at the center of the image. FIG. 8A shows an example in which the attachment position of the engaging portion 32 on the right side of the drawing is to be raised. At this time, by raising the first pedestal base 30 after raising and fixing the upper collar 35, and raising the lower color 35 and fixing it, it is possible to prevent an unexpected slippage of the first pedestal base 30.

In the can lid inspection device 1 in which the position of the camera 50 is set in the above-described method, the centerline P1 of the illuminator 20 coincides with the centerline P3 of the lens holding cylinder 52, and the center of the illuminator 20 coincides with the center of the image. Therefore, when imaging is performed at the time when the center of the can lid W transferred to the can lid inspection device 1 coincides with the center of the image, an image in which the can lid W is uniformly illuminated from all directions in the circumferential direction is obtained. In an image analysis based on such an image, it is possible to eliminate the deterioration of the inspection accuracy due to light unevenness and improve the inspection accuracy. In addition, since the present invention is a can lid inspection device 1 capable of obtaining an image without causing uneven illumination to the can lid W, the content of the inspection is not limited, and can be applied to any inspection of an inner surface inspection (EIT) after compound application, a rivet inspection (RIT) after conversion press, an external surface inspection (EOS), and an inner surface inspection (EIS).

[Other Embodiments of Camera Positioning Jig]

The camera positioning jig 100 is a half ring-shaped body 102 which is a half of a perfect ring-shaped body 101, and is a partial ring-shaped body which is a part of a perfect ring-shaped body 101. Such a partial ring-shaped body can be brought close to the inspection hole 31 from the other side of the base plate 60 and the bracket 64 to fit in the inspection hole 31 without interfering therewith, and the camera 50 can be slid in the X-direction and the Y-direction. Further, after fixing the camera 50 in a predetermined position, the partial ring-shaped body as the camera positioning jig 100 having a center angle of 180° or less can be detached from the inspection hole 31 when the camera positioning jig 100 can be slid upward above than the upper surface of the first pedestal base 30. The lower limit of the center angle of the partial ring-shaped body is not limited, but it is preferable that the center angle be 90° or more in order to stably fit the inspection hole 31 and prevent the ring-shaped body from falling down through the inspection hole 31. The preferred center angle of the partial ring-shaped body is 90° to 180°, and more preferably 150° to 180°. Note that one camera positioning jig can be shared with other can lid inspectors by forming the camera positioning jig in a detachable shape after fixing a camera.

However, the present invention does not exclude a camera positioning jig of a perfect ring-shaped body. To fit the lens holding cylinder to a perfect ring-shaped body jig, the lens holding cylinder must be lifted to a higher position than the jig, but the lens holding cylinder can be attached to the jig. Further, although the camera positioning jig cannot be detached after being fitted with the lens holding cylinder, the camera positioning jig does not interfere with imaging and therefore does not interfere with the inspection.

The position of the flange portion is not limited to the intermediate portion in the height direction of the partial ring-shaped body or the perfect ring-shaped body. The flange portion can be formed at the upper end of the partial ring-shaped body or the perfect ring-shaped body as the flange portion only needs to be able to support the partial ring-shaped body or the perfect ring-shaped body fitted in the inspection hole on the upper surface of the pedestal base. Further, as in the camera positioning jig 100 shown in FIG. 4, when the flange portion 103 is formed at a position offset from the center in the height direction of the ring-shaped body, it can be used by reversing the top and bottom according to the thickness of the pedestal base and the mounting height of the camera.

[Other Embodiments of Illumination Center Calibration Jig]

There is no limitation on the configuration of the illumination center calibration jig and the indication method of the center. Since the illustrated illumination center calibration jig 110 is centered at the intersection point 112 of the diagonal lines 111 of a square-shape, the diagonal lines 111 can be used as a standard of the direction and the inclination of the first pedestal base 30.

This application claims priority from Japanese Patent Application No. 2018-194151 filed on Oct. 15, 2018, the disclosure of which is incorporated herein by reference in its entirety.

It should be understood that the terms and expressions used herein are for the purpose of description and not of limitation, and does not exclude any equivalents of the features shown and described herein, and are intended to allow various modifications within the scope of the present invention as claimed.

INDUSTRIAL APPLICABILITY

The present invention can be used for a can lid inspection device by an image analysis.

DESCRIPTION OF SYMBOLS

1: Can lid inspection device
10: Support pole
20: Illuminator
30: First pedestal base
31: Inspection hole
50: Camera
51: Main body
52; Lens holding cylinder
60: Base plate
64: Bracket
100: Camera positioning jig
101: Perfect ring-shaped body
102: Partial ring-shaped body
103: Flange portion
110: Illumination center calibration jig
112: Intersection point (a center of an illuminator)
P1: Centerline of an illuminator
P2: Centerline of an inspection hole
P3: Centerline of a lens holding cylinder

The invention claimed is:

1. A can lid inspection device comprising:
a ring-shaped illuminator for illuminating a can lid placed on an inspection table;
a camera having a cylindrical lens holding cylinder;
a pedestal base positioned above the ring-shaped illuminator having a circular inspection hole formed at a center, wherein the camera is mounted on the pedestal base at a position where the lens holding cylinder of the camera faces the inspection hole;
a support pole including a lower end to which the ring-shaped illuminator is fixed and an upper portion supporting the pedestal base;
a camera positioning jig for fitting between the pedestal base and the camera, including a ring-shaped body and a flange portion protruded from an outer peripheral surface of the ring-shaped body, the ring-shaped body including an outer diameter portion having an outer diameter corresponding to a diameter of the inspection hole of the pedestal base and an inner diameter portion having an inner diameter corresponding to an outer diameter of the lens holding cylinder of the camera, the outer diameter portion of the ring-shaped body being fitting in the inspection hole of the pedestal base, and the inner diameter portion of the ring-shaped body being fitting in the lens holding cylinder of the camera;
an illumination center calibration jig configured to be detachably mounted on a lower surface of the illuminator, the illumination center calibration jig having a mark indicating a center of the illuminator; and
an analysis device for receiving and analyzing an image of the can lid captured by the camera,
wherein the camera positioning jig is detachable, and
wherein the ring-shaped body of the camera positioning jig is configured by a partial ring-shaped body of a perfect ring-shaped body, the partial ring-shaped body having a center angle of 90° to 180°.

2. A method of adjusting a camera position in the can lid inspection device as recited in claim 1, the method comprising:
aligning a centerline of the inspection hole and a centerline of the lens holding cylinder by fitting the lens holding cylinder to the camera positioning jig fitted in the inspection hole of the pedestal base;
imaging the illumination center calibration jig attached to the lower end of the illuminator; and
adjusting an inclination of the pedestal base so that the center of the illuminator coincides with a center of an image which is the center of the lens holding cylinder in a captured image.

3. A camera positioning jig for aligning a centerline of a circular inspection hole formed in a pedestal base with a centerline of a lens holding cylinder of a camera, the cameral positioning jig comprising:
a ring-shaped body; and
a flange portion protruded from an outer peripheral surface of the ring-shaped body,
wherein the ring-shaped body includes an outer diameter portion having an outer diameter corresponding to a diameter of the inspection hole of the pedestal base and an inner diameter portion having an inner diameter corresponding to an outer diameter of the lens holding cylinder of the camera, the outer diameter portion of the ring-shaped body being fitting in the inspection hole, and the inner diameter portion of the ring-shaped body being fitting the lens holding cylinder,
wherein the ring-shaped body of the camera positioning jig is configured by a partial ring-shaped body of a perfect ring-shaped body, the partial ring-shaped body having a center angle of 90° to 180°.

* * * * *

UNITED STATES PATENT AND TRADEMARK OFFICE
CERTIFICATE OF CORRECTION

PATENT NO. : 11,898,964 B2
APPLICATION NO. : 17/274603
DATED : February 13, 2024
INVENTOR(S) : Toshio Kogure It is certified that error appears in the above-identified patent and that said Letters Patent is hereby corrected as shown below:

On the Title Page

Item (71) and Item (73) reads "SHOWA ALUMINUM CAN CORPORATION, Tokyo (JP)", should read -- ALTEMIRA CO., LTD., TOKYO, (JP) --.

Signed and Sealed this
Twentieth Day of August, 2024

Katherine Kelly Vidal
Director of the United States Patent and Trademark Office